United States Patent [19]

Cai et al.

[11] Patent Number: 5,164,959
[45] Date of Patent: Nov. 17, 1992

[54] DIGITAL EQUALIZATION METHOD AND APPARATUS

[75] Inventors: Khiem V. Cai, Brea; Robert A. Dell-Imagine, Orange, both of Calif.

[73] Assignee: Hughes Aircraft Company, Los Angeles, Calif.

[21] Appl. No.: 643,969

[22] Filed: Jan. 22, 1991

[51] Int. Cl.$^5$ .............................................. H04K 1/00
[52] U.S. Cl. ............................................................ 375/1
[58] Field of Search ............................................... 375/1

[56] References Cited
U.S. PATENT DOCUMENTS 3,614,622 10/1971 Holsinger .................................. 375/1

*Primary Examiner*—Thomas H. Tarcza
*Assistant Examiner*—David Cain
*Attorney, Agent, or Firm*—Wanda K. Denson-Low

[57] ABSTRACT

A digital equalizer and equalization method for a spread spectrum communication link that has a dispersive channel and other systems that process signals having a sufficient degree of redundancy in time and/or phase. No training signal is required, except for an initialization bit sequence. The receiver incorporating the equalizer uses correlation over a bit time between a received signal, that includes data modulation, and a locally generated spreading signal that does not. The output of the correlator is a set of complex digital samples (I and Q-channel) taken at the spreading sequence bit rate. In the absence of multipath dispersion, there is perfect cross-correlation function, and hence only one large sample per transmitted data symbol. With multipath dispersion, the received energy is spread over two or more samples of the correlation. The equalizer combines the signal energy contained in the multiple output samples, converting the concatenation of the channel and equalizer into an equivalent nondispersive channel. The equalizer uses the output of its demodulator function to convert the data bearing signals into a known signal structure, which is used to determine the (unknown) channel impulse response. The equalizer employs optimum filtering of the individual correlation samples averaged over many bit times, to determine a set of multiplicative weights that time and phase align the samples so that they are coherently added. The equalizer improves the effective signal to noise ratio to a point that is close to the theoretical nondispersive channel without increasing signal power or reducing data rate.

15 Claims, 4 Drawing Sheets

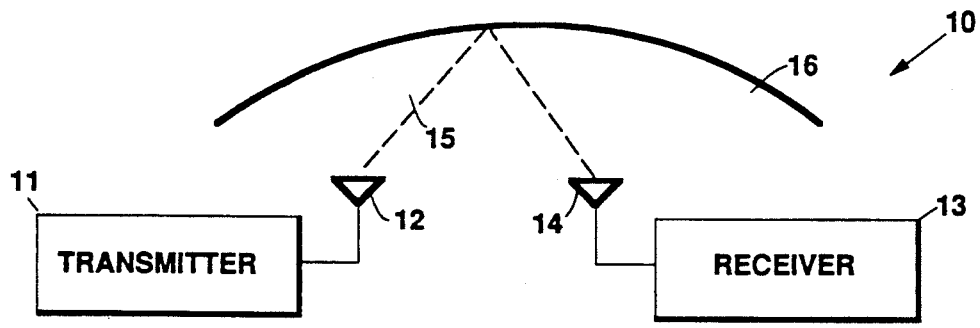
FIG. 1.
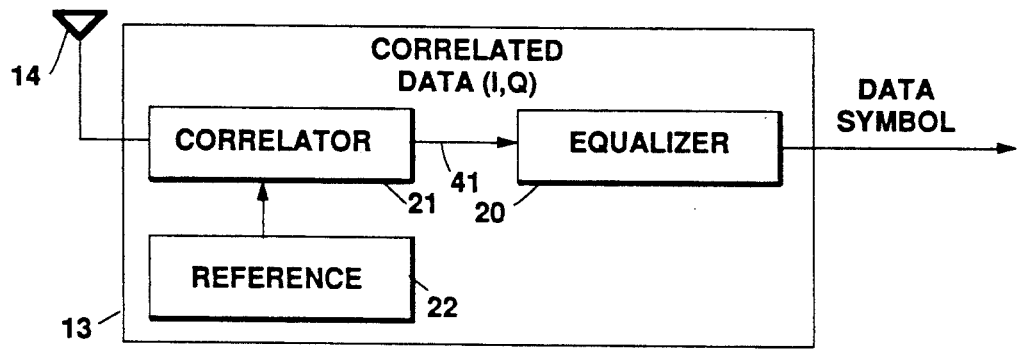
FIG. 2.
FIG. 3.
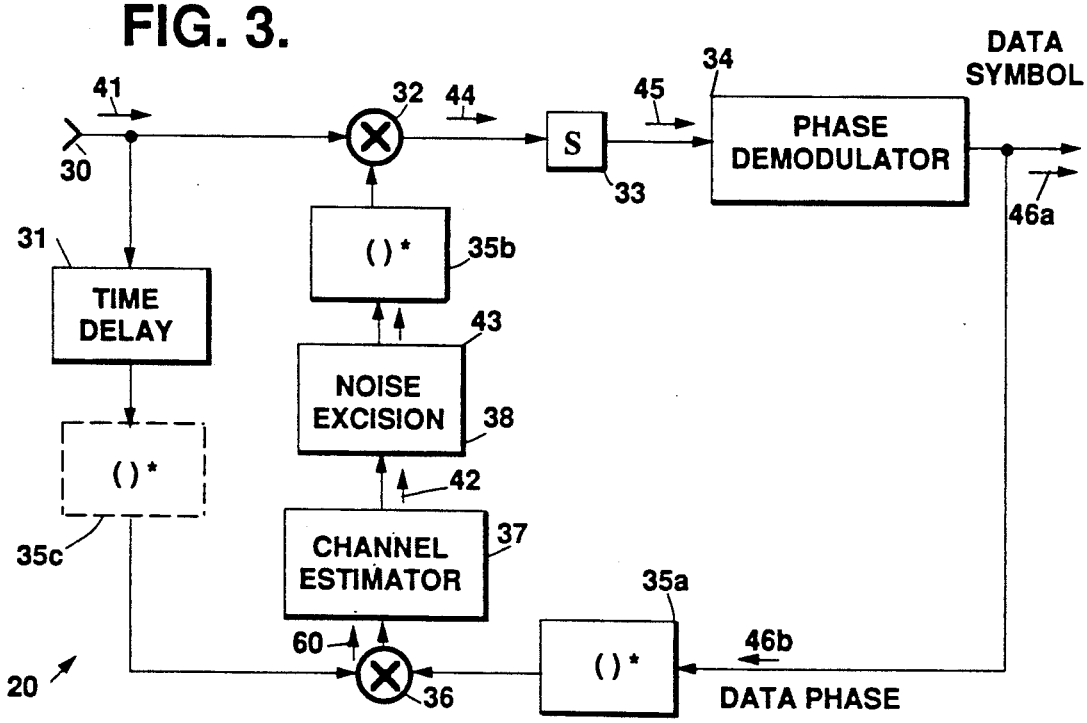

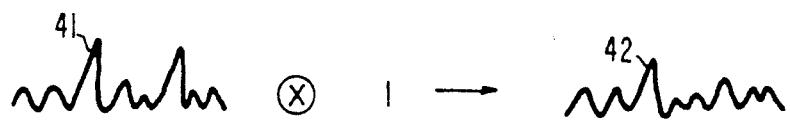
Fig. 7a.
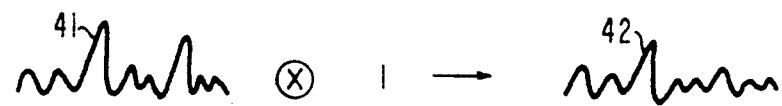
Fig. 7b.
Fig. 7c.
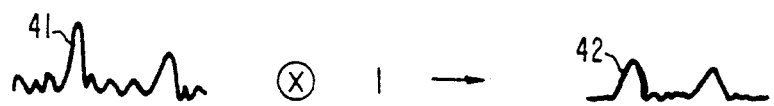
Fig. 7d.
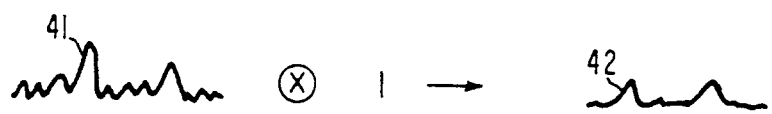
Fig. 7e.
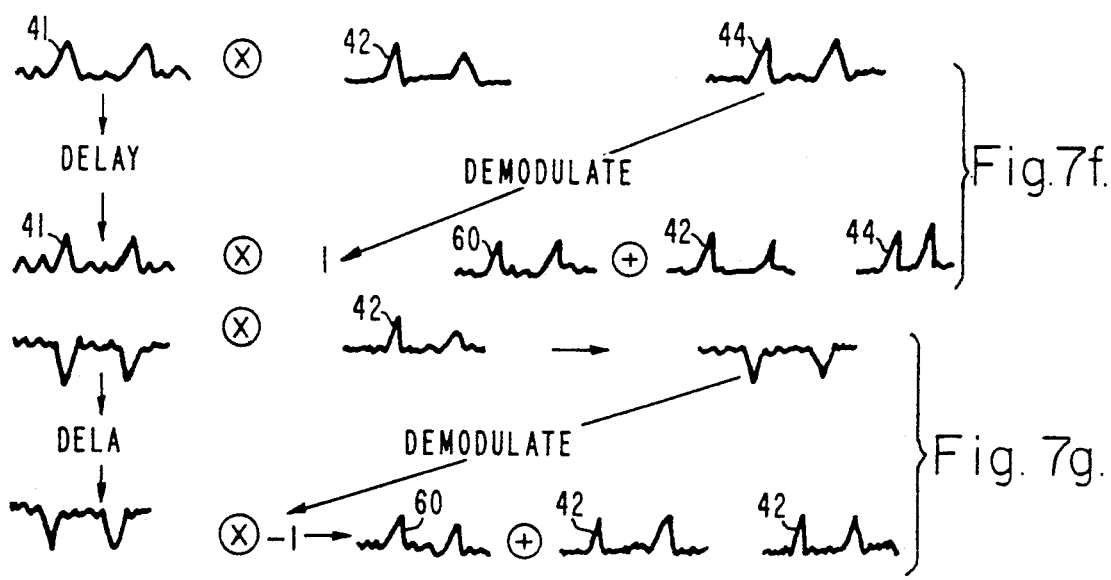
Fig. 7f.
Fig. 7g.

DIGITAL EQUALIZATION METHOD AND APPARATUS

BACKGROUND

The present invention relates generally to spread spectrum communication systems and equalization processing, and more particularly to a digital equalizer and equalizing methods for use with spread spectrum communication systems having a dispersive channel, and other systems that process signals having a sufficient degree of redundancy in time and/of phase.

The classical equalization processing is based on the concept of a RAKE receiver developed in the 1950's. The conventional technique for equalization uses a transversal filter, comprising a tapped delay line with adaptive weighting circuitry. Such classical equalizers, sometimes called transversal equalizers, consist of a tapped delay line, and a set weighting multipliers and a combiner. The outputs at the delays are weighted and then combined to align the time and phase to produce the desired signal, based on some training signal. The processing is thus performed on signal chip level. Such a transversal filter/equalizer requires complex analog or digital circuitry and extensive processing. Estimation of the weightings is the key issue in classical transversal equalizers, since the complexity of the equalizer increases in proportion to the square of the number of taps in the delay line. For a spread spectrum system operated in a large multipath spread, the equalizer complexity can become overwhelming. Very high speed processors must be used, or the equalizers can only support low data rates and narrowband signals with low processing gain.

It is therefore an objective of the present invention is to replace an analog tap delay line equalizer or a digital implementation of a transversal equalizer with a simpler, all digital microprocessor based equalizer. The present invention is particularly important in developing cost effective receivers in wideband spread spectrum receivers where analog component drifts result in large implementation losses.

SUMMARY OF THE INVENTION

The present invention is a digital implementation of an equalizer for a spread spectrum communication link which has a dispersive channel. The invention is novel in that no training signal is required, except for an initialization bit sequence, and it does not have the classic transversal equalizer structure. The digital equalizer of the present invention can be employed with spread spectrum transmissions which utilize a wide band pseudorandomly derived spreading sequence to transmit each data symbol. The receiver uses correlation over a symbol time between the received signal, that is comprised of a spreading signal and the data modulation, and a locally generated spreading signal, that does not contain any data. The output of the correlator is represented by a set of complex digital samples (I and Q-channel) taken at the spreading sequence symbol rate.

In the absence of multipath dispersion, the cross-correlation between the received signal and the locally generated reference is ideal, and hence there is only one large sample peak per transmitted data symbol. With multipath dispersion, however, the cross-correlation is spread over two or more samples of the correlation. The digital equalizer of the present invention contains processes which combines the correlated signal energy contained in the multiple cross-correlation samples to produce an output signal having coherent phase, thus converting the dispersive channel into a nondispersive channel.

The equalizer is unique in that it uses data decisions made at the output of the phase demodulator function to convert the data bearing signals into a known reference signal structure, that is used to determine the (unknown) channel impulse response. The present equalizer structure is not a classical transversal equalizer, but is implemented using optimum filtering of the individual correlation samples averaged over many bit times, to determine a set of multiplicative weights which time and phase align the samples so that they are coherently added.

The digital equalizer employs a new technique for channel multipath equalization that overcomes long-standing limitations of prior art approaches, designs and implementations. The benefits of the present invention are that the processing is a receiver function and does not limit the waveform to a specific chip modulation (i.e. BPSK, MSK, or synthesized noise); the equalization processing does not require any training signal; the equalization processing is performed on the data symbol or bit level, while the time resolution is a fraction of the chip time; and the digital equalizer is simpler compared to conventional transversal equalizers and operates with higher data rates and spreading bandwidths without the requirement for complex LSI based functions, although the present invention may be implemented with LSI circuits, if desired.

The processing implemented by the present invention is believed to be simpler than the conventional technique and operates with higher data rates and spreading bandwidths without the requirement for complex large scale integration based functions. Because the processing may be implemented in a microprocessor under firmware control, for example, it takes advantage of the ever increasing speed and power of commercially available microprocessors to expand the data rate and processing bandwidth limits of this implementation. In addition to its high performance capabilities, the digital equalizer is also inherently flexible. As a result, it can be advantageously applied in all types of reception subsystems for signals that incorporate a sufficient degree of redundancy in time and/or frequency.

The digital equalizer has been analyzed, verified by simulation, and implemented using a programmable digital signal processor and shown to be extremely effective in dispersive multipath channel. Theoretical simulation results showed that the digital equalizer enhances communication performance to a theoretical optimum performance.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a typical dispersive channel transmission system in which the digital equalizer of the present invention may be employed;

FIG. 2 shows the receiver portion of the system of FIG. 1 which incorporates the digital equalizer of the present invention;

FIG. 3 illustrates two alternative embodiments of the digital equalizer of the present invention and which may be employed in the receiver of FIG. 2;

FIGS. 7a-7g illustrate a data initialization sequence and an example of digital equalization utilizing the digital equalizer of FIG. 6.

DETAILED DESCRIPTION

Figure 4:
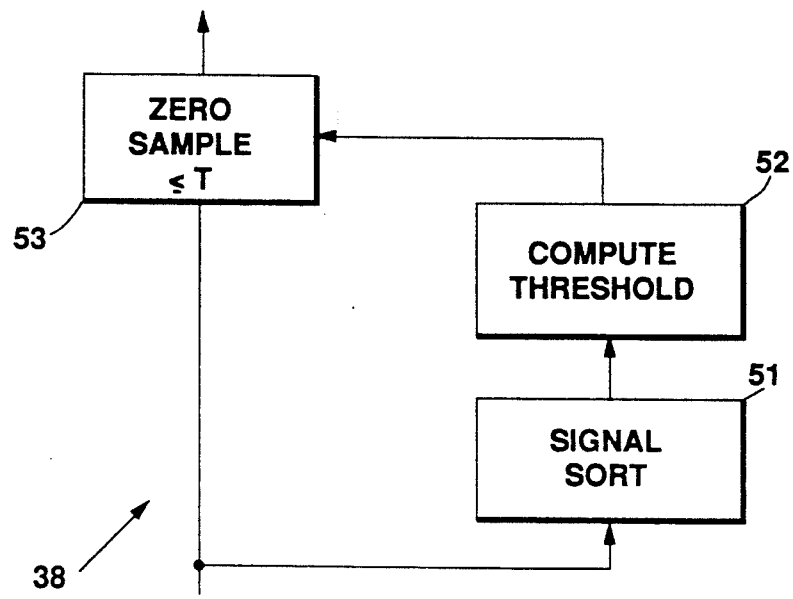
FIG. 4 illustrates an embodiment of a noise excision circuit which may be employed in the digital equalizer of FIG. 3.

Referring to the drawings, FIG. 1 shows a typical dispersive channel transmission system 10 in which the digital equalizer of the present invention may be employed. The system 10 comprises a transmitter 11, such as a spread spectrum transmitter that employs a transmitting antenna 12 adapted to transmit digitized spread spectrum signals 15 that are reflected from the ionosphere 16 to a receiving antenna 14 of a receiver 13. The system 10 has a dispersive HF channel that must be compensated for in the receiver if adequate data reception is to be achieved. The receiver 13 employs a digital equalizer in accordance with the principles of the present invention in order to accomplish this, as will be discussed in detail below. However, it is to be understood that the digital equalizer may be advantageously applied in all types of reception subsystems for signals that incorporate a sufficient degree of redundancy in time and/or frequency.

FIG. 2 shows the receiver 13 of the system 10 of FIG. 1 which incorporates a digital equalizer 20 in accordance with the principles of the present invention. The receiver 13 comprises a correlator 21 having a reference source 22 coupled thereto. The correlator 21 is adapted to process received modulated spread spectrum signals 15 and reference signals provided by the reference source 22, to generate correlated data 41, comprising I and Q-channel signals, at its output. The correlated data is 41 also referred to herein as the channel response or as the correlated output signals. The reference signal comprises a locally generated spreading signal, which does not include the data modulation contained in the received spread spectrum signal. The correlated data, comprising complex I and Q-channel signals, is coupled to the digital equalizer 20 for processing. The output of the equalizer 20 is the data symbol originally transmitted by the transmitter 11 of FIG. 1.

The cross-correlation between the received signal and the locally generated reference is comprised of N samples at the bit rate of the locally generated spreading reference taken over a data symbol duration. In the absence of dispersion, all of the cross-correlation samples will be small except for the one corresponding to zero time shift between the received data and the spreading reference. This complex sample corresponds to the complex data modulation. With dispersion, two or more of the cross-correlation samples have significant energy, corresponding to the distortion of the spreading bits by the dispersive channel.

FIG. 3 illustrates two alternative embodiments of the digital equalizer 20 of the present invention which may be employed in the receiver 13 of FIG. 2. The equalizer 20 comprises a data input that is adapted to receive the correlated data 41, shown as arrow 41. The data input is coupled to a time delay and to one input of a first multiplier 32. The time delay 31 is coupled to a first input of a second multiplier 36. The output of the first multiplier 32 is coupled to an integrator 33, whose output is coupled to a phase demodulator 34. One output of the phase demodulator 34 comprises the originally transmitted data symbol, given by the expression $k2\pi/M$, while the other output is the data phase given by the expression $\exp(jk2\pi/M)$, where $k=0,1,\ldots,M-1$, and M is the number of the symbol alphabet.

The demodulated data phase is coupled by way of a first conjugator 35a to a second input of the second multiplier 36. The output of the second multiplier 36 is coupled through a channel estimator 37 that is adapted to generate the channel weights for the equalizer 20 to noise removal circuitry 38. The output of the channel estimator 37 comprises an accumulated estimate of the matched filter signal necessary to equalize the channel response. The output of the multiplier 36 represents an estimate of the impulse response of the dispersive channel. A running average of this estimate is kept in the channel estimator 37. When the output of the channel estimator 37 multiplies the input signal 41, the output of the multiplier 32 (signal 44) is the square of the magnitude of the impulse response of the channel multiplied by the data modulation $e^{j2\pi k/M}$. The accumulator 33 sums the non-zero samples of the cross-correlation since these samples all have the complex phase of the data modulation, the output of the accumulator 33 (signal 45) is a phase-coherent combination of all of the energy in the input signal 41. The output of the noise removal circuitry 38 is coupled through a second conjugator 35b to a second input of the first multiplier 32. In the alternative embodiment of the equalizer 20, the two conjugators 35a, 35b are replaced with a single, third conjugator 35c, and the first and second conjugators 35a, 35b are removed. Each of the conjugators 35a, 35b, 35c are identified by a box having a ()* in it.

It is to be understood that the noise removal circuitry 38 is optional, and may not be required for all applications. However, it is disclosed herein for completeness. The noise excision function provided by the noise removal circuitry 38, although optional, is likely to be useful when the multipath spread is known to be contained within a few samples. The noise removal circuitry 38 removes those samples that are known to have low signal amplitude from the channel estimator 37 and sets them equal to zero. In addition, the noise removal circuitry 38 may be located between the first multiplier 32 and the integrator 33, instead of the location shown in FIG. 3.

FIG. 4 illustrates an embodiment of the noise removal circuitry 38 of FIG. 3. The noise removal circuitry 38 comprises a signal sorting circuit 51, coupled to a threshold comparison circuit 52. The output of the threshold comparison circuit 52 is coupled to a zeroing circuit 53 that zeros applied signal samples whose value are less than or equal to a predetermined threshold (shown in FIG. 5d below).

Figure 5A:
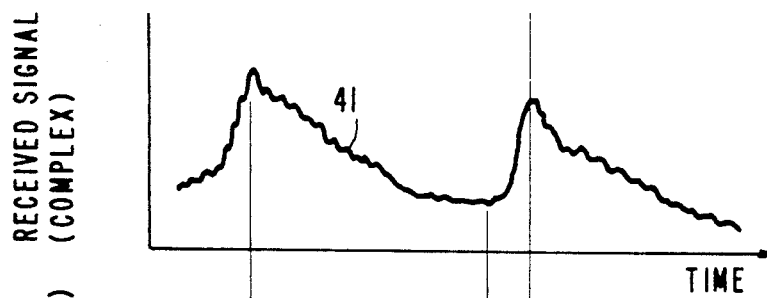
FIGS. 5a-5f show various waveforms that are present at various stages of the digital equalizer of FIG. 3.

FIGS. 5a-5f show various waveforms and computations that are present in the digital equalizer 10 of FIG. 3, and will help to explain the operation of the equalizer 20. FIG. 5a shows the correlated data 41 that is provided as output signals from the correlator 21. FIG. 5a is a graph of the received signal (complex) versus time. This signal represents the impulse response of the channel plus noise. This signal is mathematically expressed by the expression $a_i e^{j(\theta+\phi_i)}+n_i$, for $i=1, n$, where $a_i$ and $\phi_i$ are the amplitude and phase of the channel response at time sample i, n is the number of samples in a symbol duration, and $n_i$ is the complex noise at time i. The phase $\theta = k2\pi/M$, $k = 0$, M-1 is the data modulation phase of an M-phase waveform.

Figure 5B:
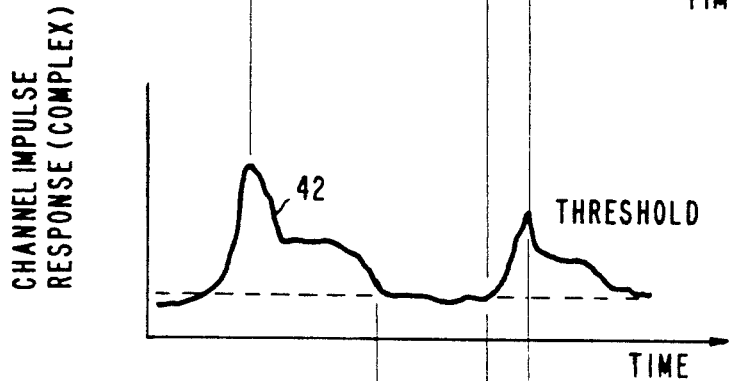

FIG. 5b shows the same signal without the modulated phase and without noise that corresponds to the accumulated signal 42 computed by the channel estimator 37. FIG. 5b is a graph of the channel impulse response (complex) versus time. The accumulated signal 42 of FIG. 5b is present at a point between the channel estimator 37 and the noise excisor 38 of FIG. 3. The threshold is shown in FIG. 4b and represent a noise removal threshold, in that all correlated data values less than or equal to the threshold are set to zero. The accumulated signal 42 is mathematically expressed by the expression $k\alpha_i e^{-j\phi_i} + n_i'$, $n=1$, n, where $n_i'$ is the noise accumulated from $n_i$.

Figure 5C:
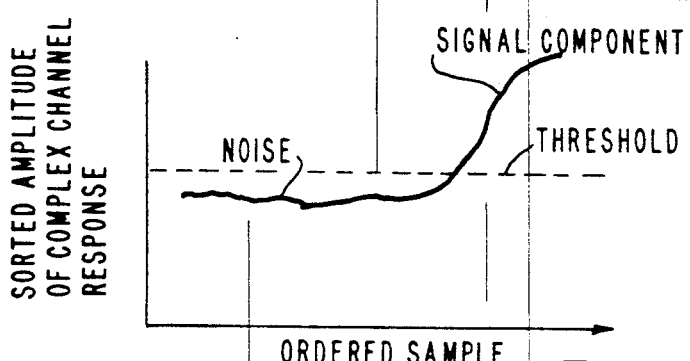

FIG. 5c is a curve representing the sorted amplitude of the complex channel response versus the set of ordered samples. The above described threshold is shown in FIG. 5c and the portion of the complex channel response below the threshold is set to zero, as will be shown in the FIGS. 5d and 5e. FIG. 5d illustrates the processing of the accumulated signal 42 in FIG. 5b using the noise removal threshold of FIG. 5c. FIG. 5d shows a graph of the thresholded complex channel impulse response versus time. The resulting noise-free accumulated signal 43 in FIG. 5d has the noise removed and the signal zeroed based on the identified threshold of FIG. 5c. FIG. 5e shows the processed signal 44 derived from multiplying the signal 41 in FIG. 1 times the signal 43 of FIG. 5d. FIG. 5e shows a graph of the processed received signal 44 versus time. Assume that the noise $n_i'$ is negligible compared to the signal component. This signal is mathematically expressed by the expression $k\alpha_i^2 e^{j\theta} + kn_{i\alpha_i} e^{-j\phi_i}$, where the first term is the signal and the second term is the noise. The processed signal 44 of FIG. 5e is then integrated in the integrator 33, which processes the signals received thereby by means of the mathematical expression:

$$\sum_{i=1}^{n} k\alpha_i^2 e^{j\theta} - \sum_{i=1}^{n} kn_i\alpha_i e^{-j\theta_i}.$$

This signal is then phase demodulated to produce the equalized data symbol 46a at the output of the phase demodulator 34.

Figure 5F:
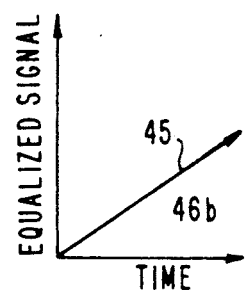
Figure 5D:
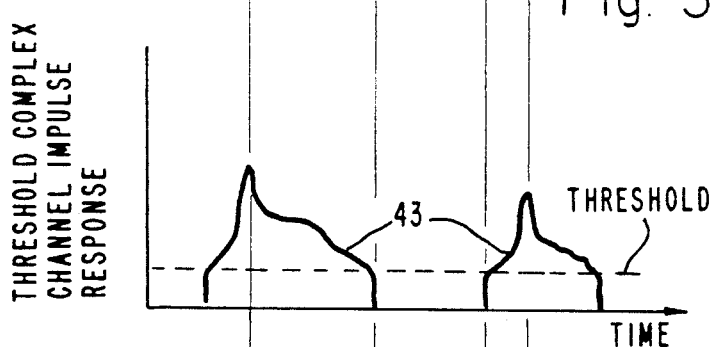
Figure 5E:
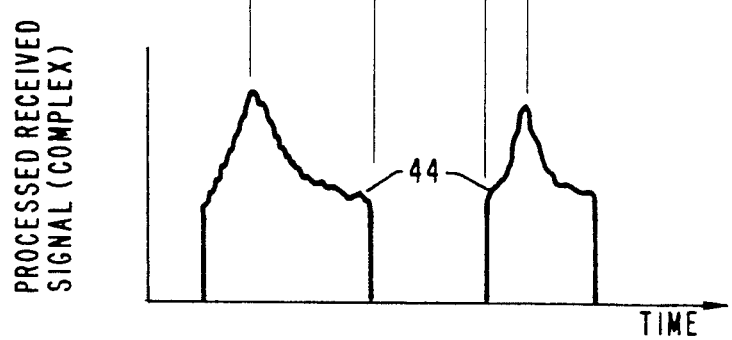

FIG. 5f shows the resultant equalized data signal 45 and the data phase 46b versus time. The equalized data symbol 46a is provided at the output of phase demodulator 34.

Figure 6:
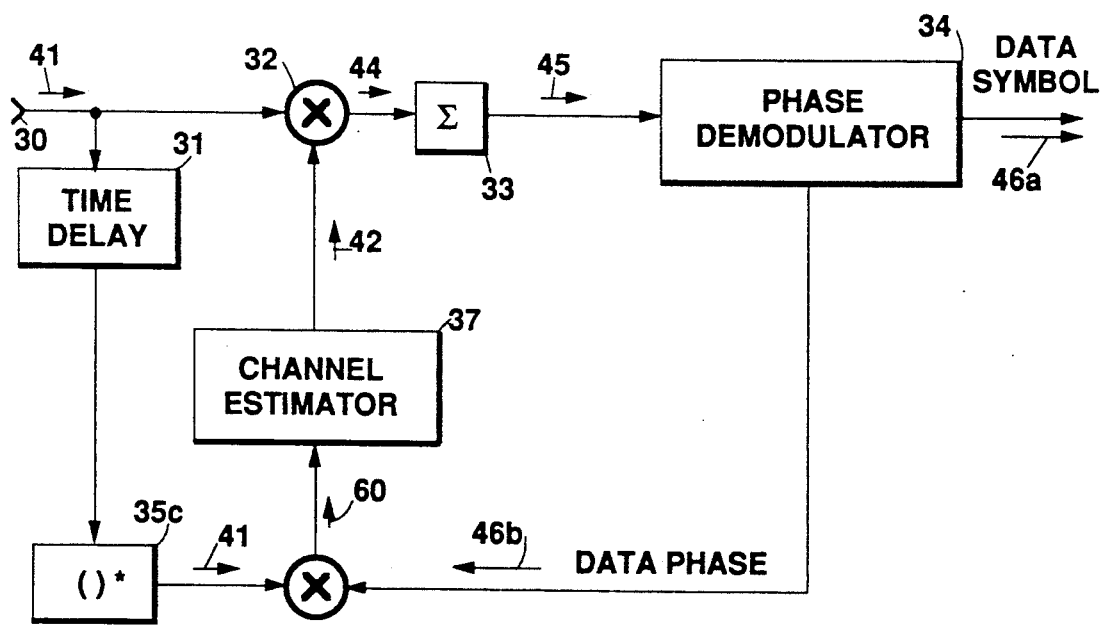
FIG. 6 illustrates a simplified embodiment of the digital equalizer of FIG. 3.

FIG. 6 illustrates a simplified embodiment of the digital equalizer 20 of FIG. 3 that is useful in explaining the operation of the present invention. The equalizer 20 comprises the time delay 31 and the first multiplier 32. The time delay 31 is coupled by way of the conjugator 35c to the second multiplier 36. The output of the first multiplier 32 is coupled to the integrator 33, which in turn is coupled to the phase demodulator 34. The phase demodulator 34 is coupled to the second multiplier 36. The second multiplier 36 is coupled through the channel estimator 37 to the first multiplier 32.

FIGS. 7a-7e illustrate an example of the operation of the equalizer 20 of FIG. 6 during initialization. For the purposes of example, assume that a data word received by the equalizer has the following form, and comprises a six bit preamble, five data initialization bits, and ten data bits. The data word has the form:

{1 −1 1 1 −1 −1 1 1 1 −1 −1 1 1 −1 1 −1 −1 −1 1 1 1 −1 −1},
| preamble | init. | data | where the first six bits are the preamble, the next five bits are the data initialization bits, and the final 10 bits are the data bits. The equalizer 20 uses the data initialization bits and data bits for processing purposes.

FIGS. 7a-7e show five sequential input signals 41 sequentially combined with the five known initialization bits {1 1-1-1 1} to produce five accumulated signals 42. Each succeeding accumulated signal 42 has less and less noise contained therein. This is achieved in the channel estimator 37 which implements the equation $x = \alpha x + \beta y$, where y corresponds to signal 60 and x corresponds to the accumulated signal 42, and where $\alpha$ and $\beta$ are adjustable weighting factors that stabilize the equalizer 20 in the presence of varying amounts of noise, and which are selected to reduce the noise contained in the processed signals. This illustrates the iterative accumulation performed in the channel estimator 37 shown in FIG. 3 and 6.

FIG. 7f and 7g show the operation of the equalizer 20 after initialization, starting with the accumulated signal 42 derived from the initialization step in FIG. 7e. In FIG. 7f, the accumulated signal 42 is multiplied by the next succeeding input signal 41 to arrive at signal 44. The signal 44 is demodulated by the phase demodulator 34 which produces a phase value of $e^{jO/M} = 1$ (corresponding to the first data bit above). The delayed input signal 41 is conjugated and multiplied by the phase value to arrive at signal 60. Signal 60 is then combined with the accumulated signal 42 to arrive at an updated accumulated signal 42, in accordance with the equation $x = \alpha x + \beta y$, which is in turn combined with the subsequent undelayed input signal 41 in the first multiplier 32.

FIG. 7g shows the above process applied to the next succeeding data bit (−1). The process is continued for all data bits in the word. The succeeding data words do not contain initialization bits and only contain the preamble and data bits shown above.

As can be seen in FIG. 7, the equalizer 20 suppresses noise while increasing the signal to noise level of the data that is processed. In essence this amounts to reducing the correlation sidelobe by way of coherent integration, which normally cannot be accomplished by a spread spectrum waveform with low processing gain.

The digital equalizer 20 may be employed with a direct sequence pseudo-noise (DSPN) or synthesized noise-like modulated receiver 13 that uses cross correlation between the received signal digital samples and the samples of a locally generated version of the pseudo-noise reference signal. Such a receiver 13 may be implemented using either a programmable correlator or equivalently a transform domain receiver, both of which are generally known in the communications art. Programmable correlators are generally well known, and are used in both the Position Location and Reporting System (PLRS) and Joint Tactical Information Distribution System (JTIDS) communications devices manufactured for the U.S. Army, and a transform domain receiver developed for the U.S. Navy, all of which were developed by Hughes Aircraft Company, the assignee of the present invention.

In summary, the receiver 13 produces a complex sequence of samples of the cross-correlation output which contain multipath components of the channel. These samples are repeated every data symbol interval with different data modulation. These samples are fed into the equalizer 20. The output of the equalizer 20, which contains the received carrier modulated by the data, is processed to determine the symbol modulation associated with each symbol interval. By assuming that these decisions are correct, the equalizer 20 uses the delayed versions of the received channel samples and strips off the data modulation. The resulting samples, which are noisy, are integrated over multiple data symbol intervals to determine a noise-free version of the complex channel samples.

The noise-free samples are used to multiply (weight) the corresponding samples of the current symbol. In the absence of noise, or on the average, the weighted samples have a magnitude equal to the square of the amplitude of the channel samples. They have a common phase equal to the data phase. Simple addition of these weighted samples provides coherent combination of the samples having the data symbol phase.

For binary phase shift keyed (BPSK) data modulation, there is a possibility that the carrier phase will be either zero or $\pi$ radians. To avoid this ambiguity, it is necessary to transmit an apriori known phase preamble or data initialization, or to differentially encode the data. In this latter case, the data decisions are demodulated by a method equivalent to well known phase coherent demodulation, followed by differential demodulation. In the case of M-ary phase modulation, there is a possible M-fold ambiguity of the carrier phase which is similarly resolved, as in the case of BPSK data modulation.

It is to be understood that the above-described invention may be implemented in hardware, firmware, or in software using a microprocessor or other programmable digital signal processor. In the software context, the above disclosure represents a description of the computational and processing steps performed in accordance with a computer algorithm representative of the invention.

Thus there has been described a new and improved a digital equalizer and equalization method for use with spread spectrum communications systems having a dispersive channel, and other systems that process signals having a sufficient degree of redundancy in time and/or phase. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A digital equalizer for use with a spread spectrum communications system, said digital equalizer comprising:
    data input means for receiving an input signal comprising a correlated output signal corresponding to a complex I and Q-channel digital signal that has a data phase associated with a non-dispersive channel and a random phase associated with a dispersive channel;
    time delay means for delaying the input signal to produce a time delayed input signal;
    demodulation means for determining the data phase contained in the input signal
    first combining means for combining the time delayed input signal with the data phase of the input signal to produce an estimated matched filter signal;
    accumulating means for computing an accumulated estimated matched filter signal;
    second combining means for combining the correlated output signal with the accumulated matched filter signal to eliminated the random phase contained in the correlated output signal;
    integrating means for integrating the correlated output signal to increase the signal to noise ration thereof and for providing a time equalized signal.

2. The equalizer of claim 1 which further comprises:
    conjugation means for providing the complex conjugate of the time delayed input signal.

3. The equalizer of claim 1 which further comprises:
    first conjugation means for providing the complex conjugate of the data phase signal; and
    second conjugation means for providing the complex conjugate of the accumulated estimated matched filter signal.

4. The equalizer of claim 1 which further comprises:
    noise removal means for removing noise from the correlated output signals by setting the values of the accumulated matched filter signals that are less than a predetermined threshold to zero.

5. The equalizer of claim 4 wherein the noise removal means comprises:
    means for sorting the accumulated matched filter signals;
    means for comparing the amplitudes of the sorted accumulated matched filter signals to the predetermined threshold; and
    means for setting the values of all accumulated matched filter signals that are less than or equal to the predetermined threshold to zero.

6. The equalizer of claim 2 which further comprises:
    noise removal means for removing noise from the correlated output signals by setting the values of the accumulated matched filter signals that are less than a predetermined threshold to zero.

7. The equalizer of claim 6 wherein the noise removal means comprises:
    means for sorting the accumulated matched filter signals;
    means for comparing the amplitudes of the sorted accumulated matched filter signals to the predetermined threshold; and
    means for setting the values of all accumulated matched filter signals that are less than or equal to the predetermined threshold to zero.

8. The equalizer of claim 3 which further comprises:
    noise removal means for removing noise from the correlated output signals by setting the values of the accumulated matched filter signals that are less than a predetermined threshold to zero.

9. The equalizer of claim 8 wherein the noise removal means comprises:
    means for sorting the accumulated matched filter signals;
    means for comparing the amplitudes of the sorted accumulated matched filter signals to the predetermined threshold; and
    means for setting the values of all accumulated matched filter signals that are less than or equal to the predetermined threshold to zero.

10. A method of digitally equalizing a data symbol transmitted using a spread spectrum communications system, said method comprising the steps of:
processing the data symbol to determine its phase;
time-delaying the data symbol;
combining the phase with the time-delayed data symbol to strip the phase from time-delayed symbol;
accumulating the combined signal to produce a matched filter signal;
combining the matched filter signal with the non time-delayed data symbol to produce a combined signal; and
integrating the combined signal to produce an equalized signal.

11. The method of claim 10 wherein the data symbol is transmitted over a dispersive channel using a spread spectrum communications system, and wherein the method further comprises the step of:
correlating a received spread spectrum communications signal with a locally generated reference signal to provide a correlated output signal comprising the data symbol encoded with the data phase and a random phase associated with the dispersive channel.

12. The method of claim 11 which further comprises the steps of:
complex conjugating the time delayed correlated output signal.

13. The method of claim 11 which further comprises the steps of:
complex conjugating the data phase signal; and
complex conjugating the accumulated estimated matched filter signal.

14. The method of claim 11 which further comprises the step of:
removing noise from the accumulated signals by setting the values of all channel impulse response signals that are less than a predetermined threshold to zero.

15. The method of claim 14 wherein the noise removing step comprises the steps of:
sorting the channel impulse response signals;
comparing the amplitudes of the sorted channel impulse response signals to the predetermined threshold; and
setting the values of all channel impulse response signals that are less than or equal to the predetermined threshold to zero.

* * * * *